(12) United States Patent
Yasunaga et al.

(10) Patent No.: US 10,871,607 B2
(45) Date of Patent: Dec. 22, 2020

(54) LIGHTING DEVICE AND DISPLAY DEVICE

(71) Applicant: SHARP KABUSHIKI KAISHA, Sakai (JP)

(72) Inventors: Hirotoshi Yasunaga, Sakai (JP); Hisashi Watanabe, Sakai (JP); Youzou Kyoukane, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/255,249

(22) Filed: Jan. 23, 2019

(65) Prior Publication Data

US 2019/0227221 A1  Jul. 25, 2019

(30) Foreign Application Priority Data

Jan. 24, 2018  (JP) ................. 2018-009912

(51) Int. Cl.
*F21V 8/00* (2006.01)
*G02F 1/13357* (2006.01)

(52) U.S. Cl.
CPC ......... *G02B 6/0055* (2013.01); *G02B 6/0051* (2013.01); *G02B 6/0068* (2013.01); *G02B 6/0073* (2013.01); *G02F 1/133605* (2013.01); *G02F 1/133606* (2013.01); *G02F 1/133611* (2013.01); *G02B 6/0031* (2013.01); *G02B 6/0043* (2013.01); *G02B 6/0065* (2013.01); *G02F 1/133603* (2013.01); *G02F 2001/133607* (2013.01)

(58) Field of Classification Search
CPC ... G02F 2001/133607; G02F 1/133605; G02F 1/133606; G02F 1/133603; G02F 1/133611; G02B 6/0055; G02B 6/0051; G02B 6/0068; G02B 6/0073; G02B 6/0031; G02B 6/0043; G02B 6/0065
See application file for complete search history.

(56) References Cited

U.S. PATENT DOCUMENTS

| 6,654,172 | B2 * | 11/2003 | Pond ................. | B60Q 1/2607 |
| | | | | 359/619 |
| 7,726,828 | B2 * | 6/2010 | Sato ................... | G02B 6/0043 |
| | | | | 362/341 |
| 8,430,519 | B2 * | 4/2013 | Takata ............... | G02B 6/0055 |
| | | | | 362/617 |

(Continued)

FOREIGN PATENT DOCUMENTS

JP  2717650 B2  2/1998

*Primary Examiner* — Arman B Fallahkhair
(74) *Attorney, Agent, or Firm* — ScienBiziP, P.C.

(57) ABSTRACT

A lighting device includes light sources arranged in a row direction and a column direction, and a reflector through which at least a part of light rays emitted by the light source. The reflector includes unit light source regions disposed at an interval from the light sources, a light reflecting pattern disposed in the unit light source regions and reflecting light, and a light transmitting pattern disposed in the unit light source regions and transmissive to the part of the light rays. The unit light source regions are disposed such that the unit light source regions adjacent to each other with respect to at least one of the row direction and the column direction have different distributions of at least one of the light reflecting pattern and the light transmitting pattern.

16 Claims, 14 Drawing Sheets

(56) References Cited

U.S. PATENT DOCUMENTS

| | | | |
|---|---|---|---|
| 8,675,151 B2* | 3/2014 | Choi | G02F 1/133603 |
| | | | 349/64 |
| 9,904,105 B2* | 2/2018 | Ma | G02F 1/133606 |
| 10,072,816 B2* | 9/2018 | Shen | F21V 5/005 |
| 2012/0013811 A1* | 1/2012 | Shimizu | G02B 6/0016 |
| | | | 348/739 |

* cited by examiner

LIGHTING DEVICE AND DISPLAY DEVICE

CROSS REFERENCE TO RELATED APPLICATION

This application claims priority from Japanese Patent Application No. 2018-009912 filed on Jan. 24, 2018. The entire contents of the priority application are incorporated herein by reference.

TECHNICAL FIELD

The technology described herein relates to a lighting device and a display device.

BACKGROUND

A conventional example of a backlight device for use in a liquid crystal display device and the like includes a lighting plate. The lighting plate includes a light transmissive plate that has a light-transmissive printed film formed on a front surface or a back surface thereof in a position corresponding to a light source. The ratio of the area occupied by the light-transmissive printed film per unit area of the light transmissive plate is adjusted to be higher in portions in which the luminance of light from the light source is high, while the ratio is gradually decreased from the high luminance portions as the luminance of light decreases. An example of such a backlight device is disclosed in Japanese Patent No. 2717650.

In the backlight device described in Japanese Patent No. 2717650, the ratio of the area occupied by the light-transmissive printed film is periodically changed in accordance with the distance from the light source. Thus, light exiting the light transmissive plate may have periodic luminance unevenness due to the periodic arrangement of the light-transmissive printed film.

SUMMARY

The technology described herein was made in view of the above circumstances. An object is to suppress the occurrence of periodic luminance unevenness.

According to the technology described herein, a lighting device includes light sources arranged in a row direction and a column direction, and a reflector through which at least a part of light rays emitted by the light source. The reflector includes unit light source regions disposed at an interval from the light sources, a light reflecting pattern disposed in the unit light source regions and reflecting light, and a light transmitting pattern disposed in the unit light source regions and transmissive to light. The unit light source regions are disposed such that the unit light source regions adjacent to each other with respect to at least one of the row direction and the column direction have different distributions of at least one of the light reflecting pattern and the light transmitting pattern.

In this way, the unit light source regions of the reflector are disposed side by side in the row direction and the column direction, similarly to the light sources. In the unit light source regions, the light reflecting pattern reflecting light and the light transmitting pattern transmissive to light are provided to control the distribution of the amount of exit light. The unit light source regions adjacent to each other with respect to at least one of the row direction and the column direction have different distributions of at least one of the light reflecting pattern and the light transmitting pattern. Accordingly, at least one of the light reflecting pattern and the light transmitting pattern is prevented from having continuous periodicity with respect to at least one of the row direction and the column direction. In this way, visual recognition of periodic luminance unevenness is made difficult.

According to the technology described herein, it becomes possible to suppress the occurrence of periodic luminance unevenness.

DETAILED DESCRIPTION

First Embodiment

Figure 11:
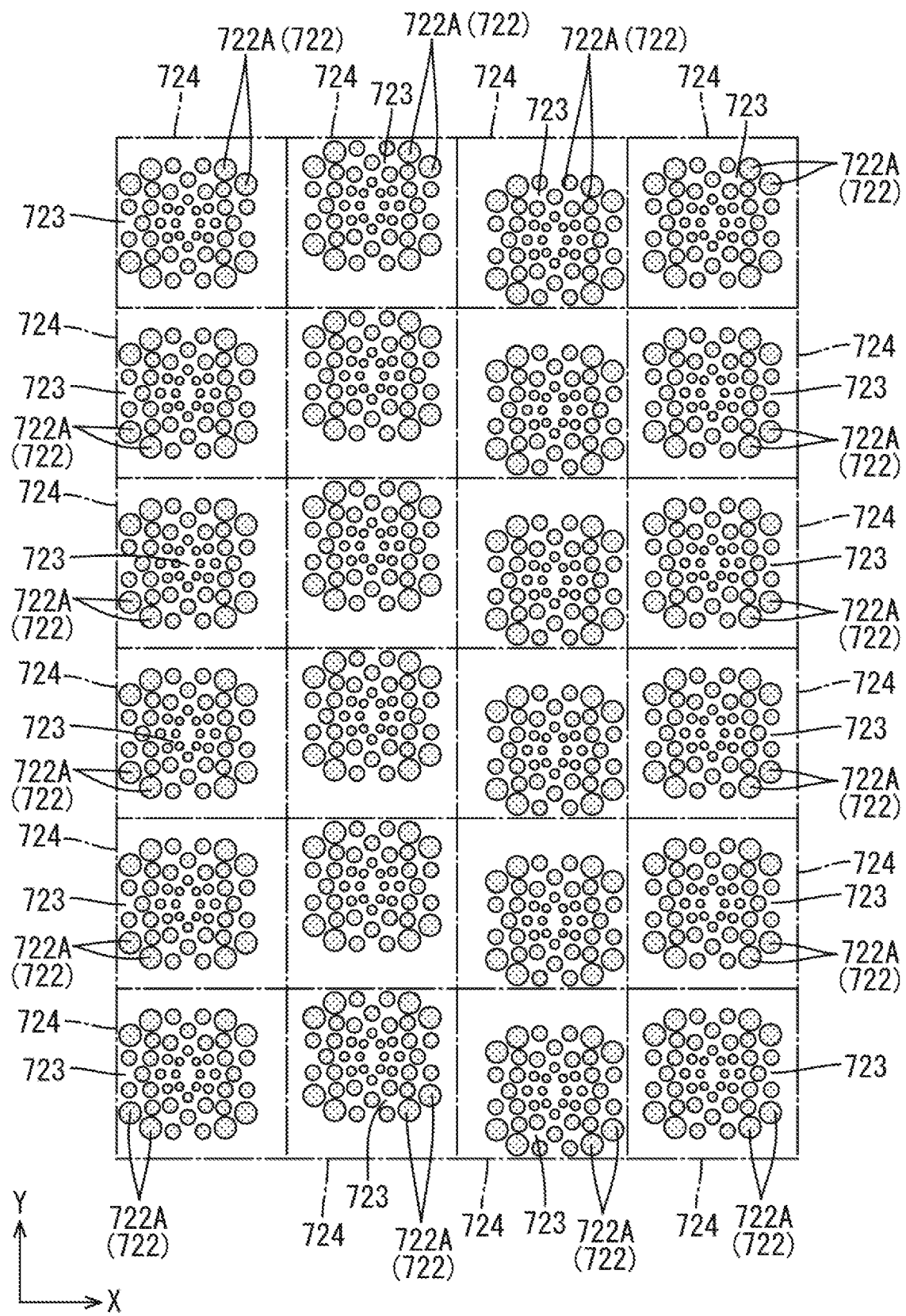
FIG. 11 is a plan view of unit LED regions on a reflector according to the eighth embodiment.

A first embodiment of the technology described herein will be described with reference to FIGS. 1 to 3. In the present embodiment, a liquid crystal display device (display device) 10 will be described by way of example. In parts of the drawings, the X-axis, the Y-axis, and the Z-axis are indicated, the respective axial directions corresponding to the directions indicated in the drawings. With reference to FIG. 11, the top corresponds to the front side, and the bottom corresponds to the back side.

Figure 1:
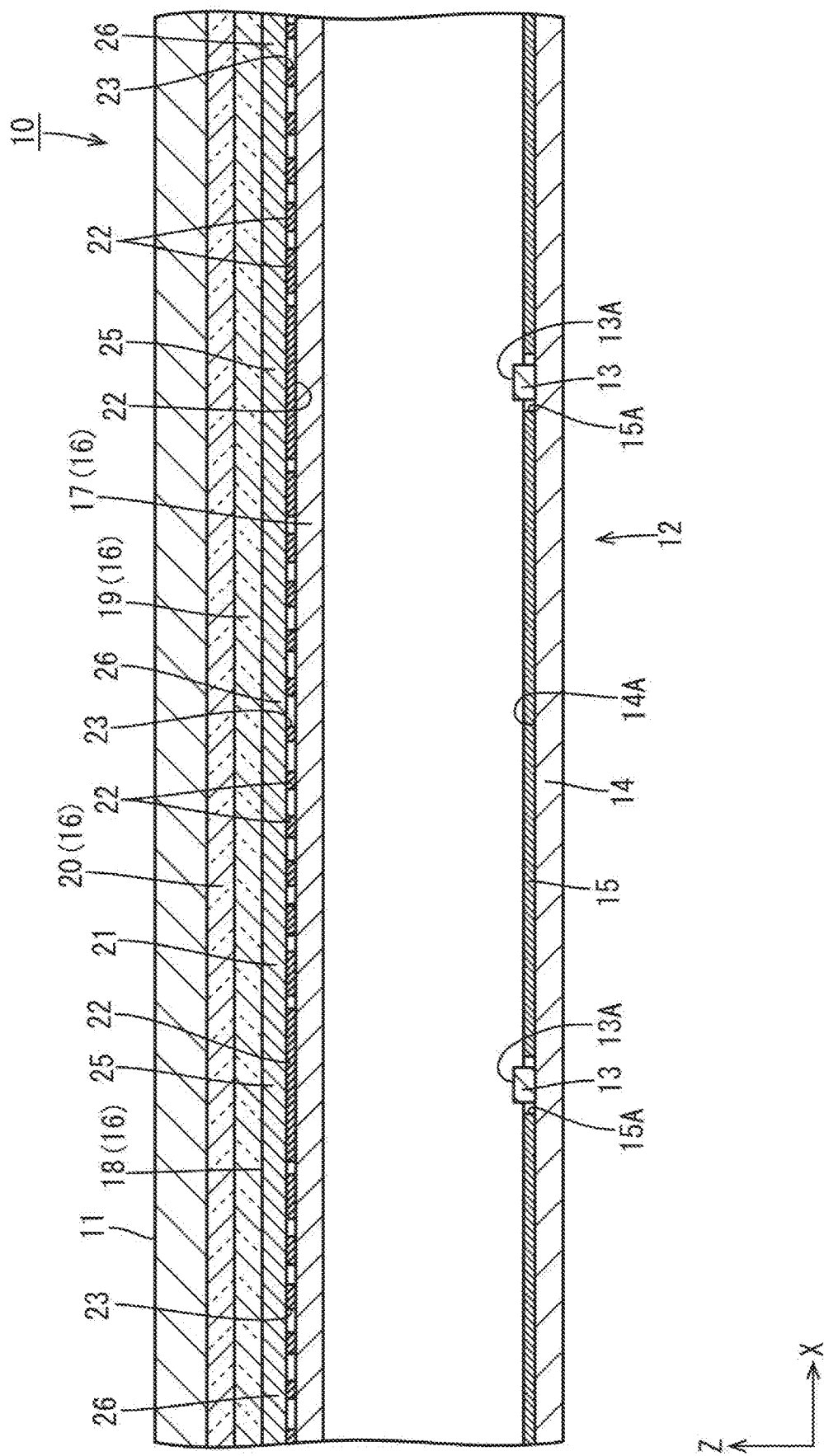
FIG. 1 is a cross sectional view of a liquid crystal display device according to the first embodiment.

As illustrated in FIG. 1, the liquid crystal display device 10 is provided with at least a liquid crystal panel (display panel) 11 configured to display an image, and a backlight device (lighting device) 12. The backlight device 12 is an external light source which is disposed on the back side (light input side) with respect to the liquid crystal panel 11, and which irradiates the liquid crystal panel 11 with light for display. The liquid crystal panel 11 includes a pair of glass substrates affixed to each other with a predetermined gap therebetween, with liquid crystal sealed between the glass substrates. One of the glass substrates (array substrate, active matrix substrate) is provided with: switching elements (such as TFTs) connected to source wires and gate wires orthogonal to each other; pixel electrodes connected to the switching elements; and an alignment film, for example. The other glass substrate (counter substrate, CF substrate) is provided with: a color filter having a predetermined array of colored portions of red (R), green (G), blue (B) and the like disposed thereon; a black matrix partitioning the color filter; and an alignment film, for example. A polarizing plate is disposed on the outside of each of the glass substrates.

The backlight device 12 will be described. As illustrated in FIG. 1, the backlight device 12 is provided with: LEDs 13 serving as a light source; an LED substrate (light source substrate) 14 on which the LEDs 13 are mounted; a reflecting sheet 15 covering the surface of the LED substrate 14 and reflecting light; and an optical member 16 opposing the LEDs 13 at an interval therebetween. Thus, the backlight device 12 of the present embodiment is the so-called direct-type in which the LEDs 13 are disposed directly under the liquid crystal panel 11 and the optical member 16. Preferably, the backlight device 12 is provided with a box-like frame holding the peripheral end portions of the optical member 16. In the following, the constituent components of the backlight device 12 will be described.

Figure 2:
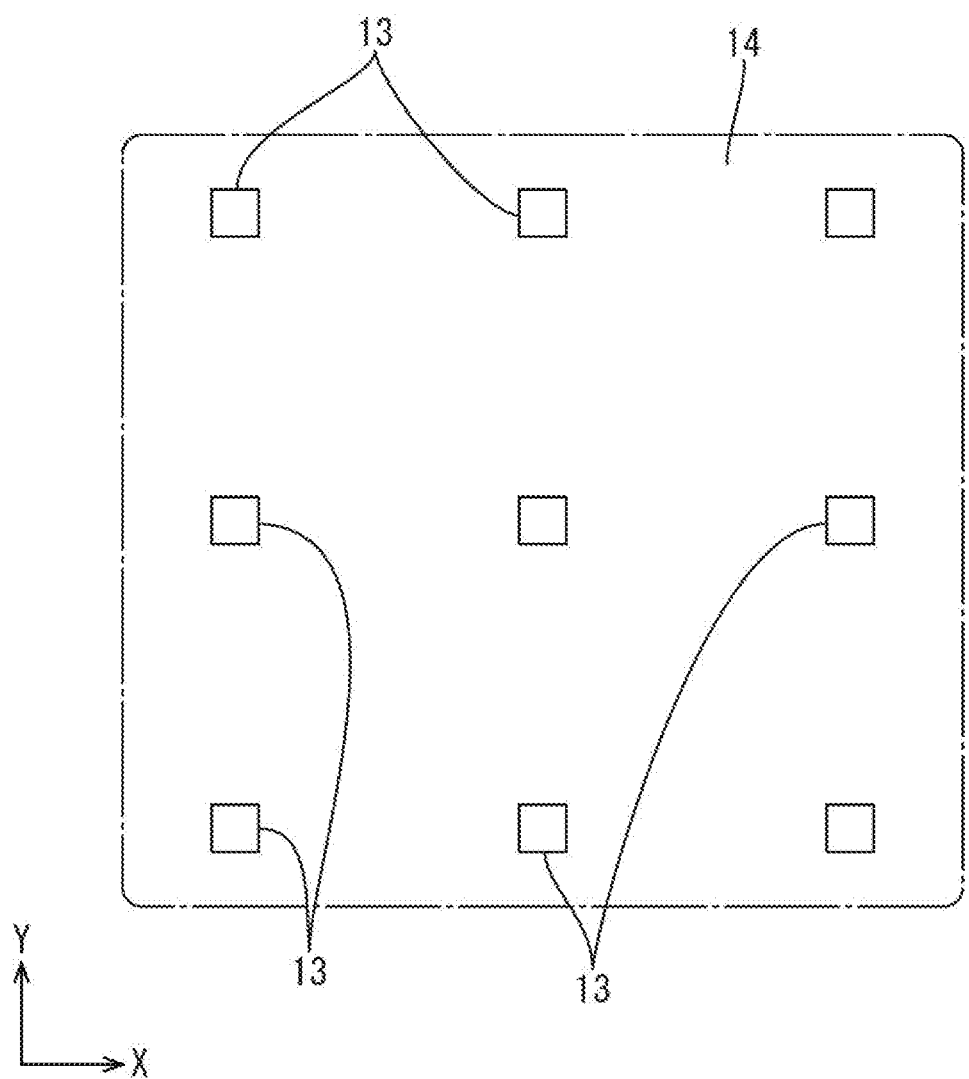
FIG. 2 is a plan view depicting a planar arrangement of LEDs on an LED substrate of a backlight device with which the liquid crystal display device is provided.

As illustrated in FIG. 1 and FIG. 2, LEDs 13 are disposed side by side at intervals in each of the X-axis direction (row direction) and the Y-axis direction (column direction), forming a matrix (rows and columns) within a plate surface of the LED substrate 14. The LEDs 13 are of the top-emitting type in which the LEDs 13 are mounted on the front-side plate surface of the LED substrate 14, with a light-emitting surface 13A facing the opposite side (front side) from the LED substrate 14 side. The LEDs 13 are positioned such that the light-emitting surface 13A is opposed to a plate surface of the optical member 16. The LEDs 13 each include a substrate portion fixedly mounted to the plate surface of the LED substrate 14, and an LED chip (LED element), which is a semiconductor light emitting element, sealed thereon with a sealing material. The LED chips of the LEDs 13 emit a single color of blue, for example. The sealing material contains phosphors (yellow phosphor, green phosphor, and red phosphor, for example) dispersed and blended therein. Thus, the LEDs 13 as a whole emit white light.

As illustrated in FIG. 1, the LED substrate 14 has a plate shape with plate surfaces parallel with the plate surfaces of the reflecting sheet 15 and the optical member 16. The LED substrate 14 has a front-side plate surface opposed to the plate surfaces of the reflecting sheet 15 and the optical member 16, the front-side plate surface constituting a mounting surface 14A on which the LEDs 13 are mounted. On the mounting surface 14A of the LED substrate 14, wiring made of metal film, such as copper foil, is formed. The wiring is used to supply power to the LEDs 13.

The reflecting sheet 15 is made of synthetic resin, and has a highly optically reflective white surface. As illustrated in FIG. 1, the reflecting sheet 15 is laminated so as to cover substantially the entire area of the mounting surface 14A of the LED substrate 14. The reflecting sheet 15 includes LED passing holes 15A formed in positions overlapping the LEDs 13 to separately pass the LEDs 13. LED passing holes 15A are disposed side by side at intervals in each of the X-axis direction and the Y-axis direction, forming a matrix aligned with the LEDs 13 on the LED substrate 14.

As illustrated in FIG. 11, the optical member 16 has plate surfaces parallel with the plate surfaces of the liquid crystal panel 11 and the LED substrate 14, for example. The optical member 16 is interposed between the liquid crystal panel 11 and the LEDs 13 with respect to the Z-axis direction. The optical member 16 has the function of causing the light emitted from the LEDs 13 to exit toward the liquid crystal panel 11, while providing the light with a predetermined optical action. The plate surfaces of the optical member 16 include a back-side plate surface opposed to the mounting surface 14A of the LED substrate 14. The back-side plate surface constitutes a light input surface for entering light. The plate surfaces of the optical member 16 also include a front-side plate surface opposed to the liquid crystal panel 11. The front-side plate surface constitutes a light output surface for exiting light. The optical member 16 includes four layers laminated together. The four layers include, in order from the back side: a diffusion sheet 17; a reflector 18; a first lens sheet 19; and a second lens sheet 20. The diffusion sheet 17 includes a base material made of substantially transparent synthetic resin. In the base material, a large number of diffusing particles are dispersed and blended to diffuse light. The two lens sheets 19, 20 each include a base material made of substantially transparent synthetic resin. The base material has a plate surface on which a large number of unit lenses extending in the X-axis direction or the Y-axis direction are disposed side by side in a direction (the Y-axis direction or the X-axis direction) orthogonal to the direction of extension. The two lens sheets 19, 20 subject entry light to a light collecting action selectively with respect to the direction in which the unit lenses are arranged.

The reflector 18 will be described. As illustrated in FIG. 1, the reflector 18 includes a transmissive substrate 21 opposed to the LEDs 13 at an interval on the front side. The transmissive substrate 21 has a plate surface on which a light reflecting pattern 22 for reflecting light is disposed. In FIG. 1, the distribution of the light reflecting pattern 22 (light transmitting pattern 23) is schematically depicted. The transmissive substrate 21 is made of substantially transparent synthetic resin (such as acrylic resin), and is transmissive to light (visible light rays). Thus, portions of the transmissive substrate 21 in which the light reflecting pattern 22 is not formed constitute a light transmitting pattern 23 transmissive to light. The transmissive substrate 21 is partitioned into unit LED regions 24 separately associated with the LEDs 13 disposed in an overlapping manner in the plate surface of the transmissive substrate 21. As illustrated in FIG. 3, the unit LED regions 24 have a substantially square shape as viewed in plan, with each side having a length greater than the outer shape dimension of the LEDs 13. Similarly to the LEDs 13 disposed opposite at an interval, unit LED regions 24 are disposed side by side at intervals in each of the X-axis direction (row direction) and the Y-axis direction (column direction), forming a matrix (rows and columns). Each of the unit LED regions 24 includes an LED overlapping region (light source overlapping region) 25 overlapping the LED 13 as viewed in plan, and an LED peripheral region (light source peripheral region) 26. The LED peripheral region 26 does not overlap the LED 13 as viewed in plan, and is disposed around the LED overlapping region 25. In FIG. 3, a total of four unit LED regions 24, two arranged in the X-axis direction and two in the Y-axis direction, are depicted as a representative example. In the example, the light reflecting pattern 22 in each of the unit LED regions 24 is depicted by shading.

The light reflecting pattern 22 is made of highly light reflective white ink (white paint). The light reflecting pattern 22 is formed on the back-side plate surface (light input surface) of the transmissive substrate 21 by, for example, screen printing, printing using an inkjet device or a dispenser device, or gravure printing. The material of the light reflecting pattern 22 may be a metal material (such as aluminum or silver). In this case, it is possible to form the light reflecting pattern 22 by depositing a metal thin-film on the plate surface of the transmissive substrate 21 by vapor deposition process (masked deposition). As illustrated in FIG. 3, the light reflecting pattern 22 includes a large number of light reflecting dots 22A dispersed and arranged at a predetermined distribution in the plane of the unit LED regions 24. In the present embodiment, the light reflecting dots 22A have a circular plane shape. The light reflecting pattern 22 is patterned in the unit LED regions 24 in such a way that the distribution varies in accordance with the distance from the center (LEDs 13). That is, the light reflecting pattern 22 is patterned in the unit LED regions 24 in such a way that the light reflecting pattern 22 has a relatively high area ratio in the LED overlapping region 25 and a relatively low area ratio in the LED peripheral region 26. Specifically, the large number of light reflecting dots 22A forming the light reflecting pattern 22 are distributed such that the light reflecting dots 22A have smaller radial dimension and surface area with increasing distance from the center of the unit LED regions 24, and greater radial dimension and surface area with decreasing distance from the center of the unit LED regions 24. Accordingly, the light transmitting pattern 23, which corresponds to the portions of the transmissive substrate 21 in which the light reflecting pattern 22 is not formed, has a distribution that is inversely correlated with the distribution of the light reflecting pattern 22. Specifically, the light transmitting pattern 23 is distributed in the unit LED regions 24 in such a way that the light transmitting pattern 23 has a relatively low area ratio in the LED overlapping region 25 and a relatively high area ratio in the LED peripheral region 26. In this configuration, as the light emitted from the LEDs 13 reaches the reflector 18, a large amount of the light is reflected toward the back side (the side of the LEDs 13) in the LED overlapping region 25 due to the light reflecting pattern 22 having a higher area ratio. On the other hand, in the LED peripheral region 26, the light is transmitted toward the front side (light output side) by the light transmitting pattern 23 having a higher area ratio. The light reflected by the light reflecting pattern 22 is reflected by the reflecting sheet 15, for example, and reaches the reflector 18 again. In this process, some of the light travels toward the LED peripheral region 26 and passes through the light transmitting pattern 23. Thus, in the LED overlapping region 25 in which the amount of light is inherently large, the output of light is suppressed, while in the LED peripheral region 26 in which the amount of light is inherently small, the output of light is promoted. In this way, the amount of exit light is made uniform. The light reflecting pattern 22 has an area ratio of nearly 100% in the LED overlapping region 25. That is, the LED overlapping region 25 is entirely covered with the light reflecting pattern 22. Accordingly, nearly all of the light emitted from the LEDs 13 and traveling toward the LED overlapping region 25 is reflected toward the back side by the light reflecting pattern 22, and prevented from directly passing through the LED overlapping region 25. In this way, the LEDs 13 are prevented from being directly visually recognized by the user, making luminance unevenness difficult to occur in a more preferable manner.

Figure 3:
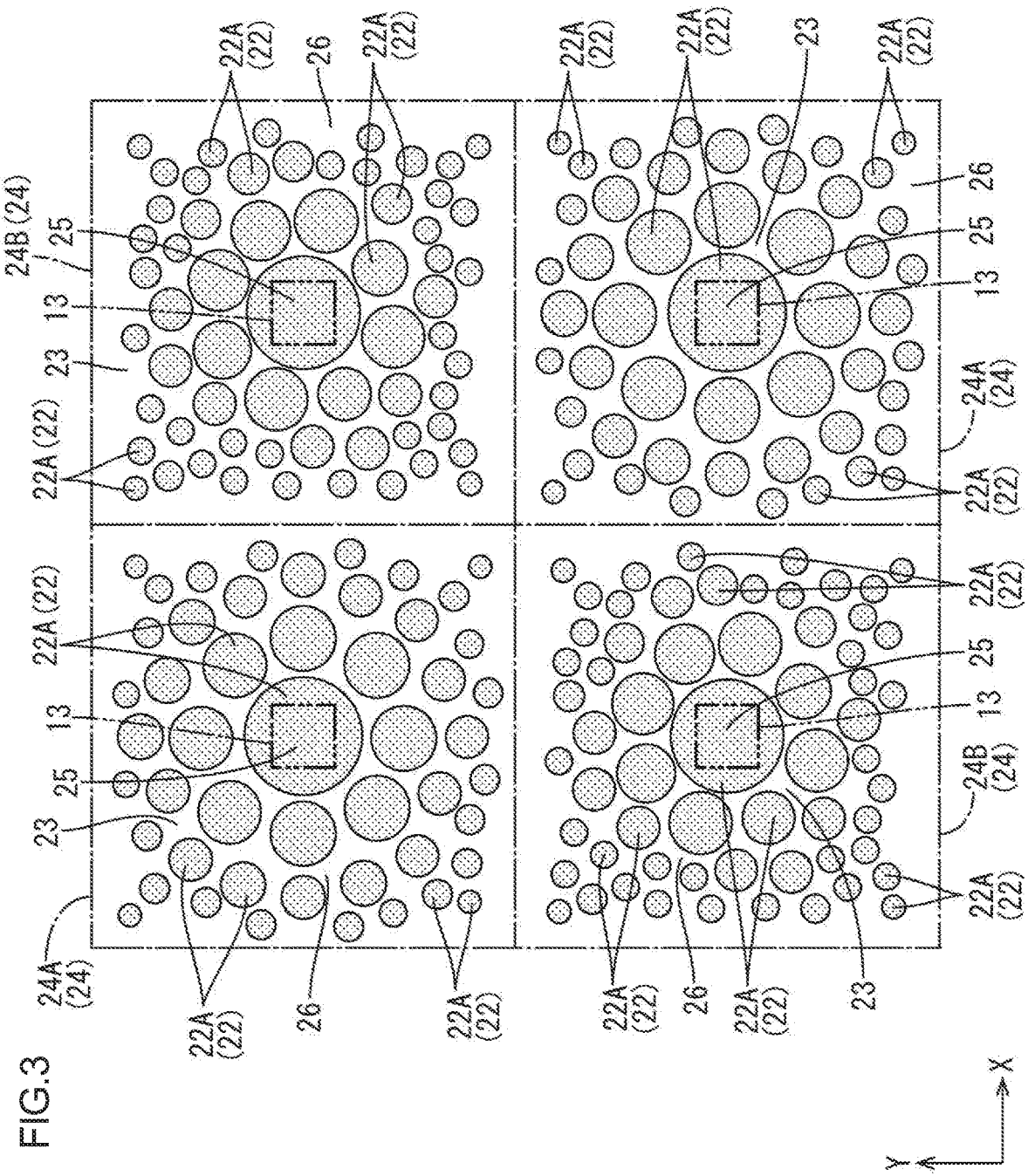
FIG. 3 is a plan view of unit LED regions on a reflector.

As illustrated in FIG. 3, the unit LED regions 24 according to the present embodiment are disposed such that the distribution of the light reflecting pattern 22 and the light transmitting pattern 23 is different between the adjacent regions with respect to the X-axis direction and the Y-axis direction. That is, the unit LED regions 24 include a first unit LED region 24A and a second unit LED region 24B that have different distributions of the light reflecting pattern 22 and the light transmitting pattern 23, the two types being disposed adjacent to each other with respect to the X-axis direction and the Y-axis direction. In this configuration, both the light reflecting pattern 22 and the light transmitting pattern 23 provided in the unit LED regions 24 adjacent to each other with respect to the X-axis direction and the Y-axis direction are prevented from having continuous periodicity with respect to the X-axis direction and the Y-axis direction. In this way, periodic luminance unevenness is made extremely difficult to be visually recognized, making it possible to obtain a luminance uniformity of 85% or more with respect to the exit light of the backlight device 12. In the following, when the unit LED regions 24 are distinguished, those depicted in the upper-left position and lower-right position of FIG. 3 will be referred to as "first unit LED region" with suffix A attached to the reference symbol, and those depicted in the lower-left position and upper-right position of FIG. 3 will be referred to as "second unit LED region" with suffix B attached to the reference symbol. When not distinguished and collectively referenced, no suffix will be attached to the corresponding reference symbols.

As illustrated in FIG. 3, the first unit LED regions 24A and the second unit LED regions 24B have equal area ratios of the light reflecting pattern 22 and the light transmitting pattern 23. That is, the area ratio of the light reflecting pattern 22 in the first unit LED region 24A and the area ratio of the light reflecting pattern 22 in the second unit LED region 24B are equal to each other; and the area ratio of the light transmitting pattern 23 in the first unit LED region 24A and the area ratio of the light transmitting pattern 23 in the second unit LED region 24B are equal to each other. In this configuration, the amount of exit light becomes the same between the first unit LED regions 24A and the second unit LED regions 24B adjacent to each other with respect to the X-axis direction and the Y-axis direction, making luminance difference difficult to occur. In this way, luminance unevenness is made difficult to occur in the exit light of the reflector 18.

As illustrated in FIG. 3, the four unit LED regions 24 are disposed such that those adjacent to each other with respect to diagonal directions relative to the X-axis direction and the Y-axis direction have the same distribution of the light reflecting pattern 22 and the light transmitting pattern 23. That is, in FIG. 3, the two first unit LED regions 24A are disposed in the upper-left position and lower-right position, and are adjacent to each other with respect to a diagonal direction relative to the X-axis direction and the Y-axis direction. Similarly, in FIG. 3, the two second unit LED regions 24B are disposed in the lower-left position and upper-right position, and are adjacent to each other with respect to a diagonal direction relative to the X-axis direction and the Y-axis direction. In this configuration, the designing of the light reflecting pattern 22 and the light transmitting pattern 23 in the unit LED regions 24 is simplified, enabling an increase in productivity and the like.

As described above, in the present embodiment, the backlight device (lighting device) 12 includes the LEDs (light source) 13 arranged in the row direction and the column direction, and the reflector 18 transmissive to at least some of the light emitted from the LEDs 13. The reflector 18 includes: the unit LED regions (unit light source regions) 24 disposed at an interval from the LEDs 13; the light reflecting pattern 22 disposed in the unit LED regions 24 and reflecting light; and the light transmitting pattern 23 disposed in the unit LED regions 24 and transmissive to light. The unit LED regions 24 are disposed such that the unit LED regions 24 adjacent to each other with respect to at least one of the row direction and the column direction have different distributions of at least one of the light reflecting pattern 22 and the light transmitting pattern 23.

In this way, the unit LED regions 24 of the reflector 18 are disposed side by side in the row direction and the column direction, similarly to the LEDs 13 opposed thereto. The unit LED regions 24 include the light reflecting pattern 22 reflecting light and the light transmitting pattern 23 transmissive to light to control the distribution of the amount of exit light. The unit LED regions 24 adjacent to each other with respect to at least one of the row direction and the column direction have different distributions of at least one of the light reflecting pattern 22 and the light transmitting pattern 23. Accordingly, at least one of the light reflecting pattern 22 and the light transmitting pattern 23 is prevented from having continuous periodicity with respect to at least one of the row direction and the column direction. In this way, visual recognition of periodic luminance unevenness is made difficult.

The unit LED regions 24 are provided such that those having different distributions of at least one of the light reflecting pattern 22 and the light transmitting pattern 23 have equal area ratios of the light reflecting pattern 22 and the light transmitting pattern 23. In this way, luminance difference in exit light is made difficult to occur between the unit LED regions 24 having different distributions of at least one of the light reflecting pattern 22 and the light transmitting pattern 23. Consequently, luminance unevenness is made difficult to occur in the exit light of the reflector 18.

The unit LED regions 24 are disposed such that those adjacent to each other with respect to at least one of the row direction and the column direction have different distributions of each of the light reflecting pattern 22 and the light transmitting pattern 23. In this way, the light reflecting pattern 22 and the light transmitting pattern 23 are prevented from having continuous periodicity with respect to at least one of the row direction and the column direction. Consequently, visual recognition of periodic luminance unevenness is made more difficult.

The unit LED regions 24 are disposed such that those adjacent to each other with respect to the row direction and the column direction have different distributions of at least one of the light reflecting pattern 22 and the light transmitting pattern 23. In this way, at least one of the light reflecting pattern 22 and the light transmitting pattern 23 is prevented from having continuous periodicity with respect to each of the row direction and the column direction. Consequently, visual recognition of periodic luminance unevenness is made more difficult.

The unit LED regions 24 are disposed such that those adjacent to each other with respect to diagonal directions relative to the row direction and the column direction have the same distribution of at least one of the light reflecting pattern 22 and the light transmitting pattern 23. In this way, the designing of the light reflecting pattern 22 and the light transmitting pattern 23 in the unit LED regions 24 is simplified, enabling an increase in productivity and the like.

The unit LED regions 24 include the LED overlapping region (light source overlapping region) 25 overlapping the LEDs 13 and the LED peripheral region (light source peripheral region) 26 disposed around the LED overlapping region 25. The light reflecting pattern 22 is provided in the unit LED regions 24 so as to have a higher area ratio in the LED overlapping region 25 than in the LED peripheral region 26. The light transmitting pattern 23 is provided in the unit LED regions 24 so as to have a higher area ratio in the LED peripheral region 26 than in the LED overlapping region 25. In this way, in the unit LED regions 24 of the reflector 18, in the LED overlapping region 25, the area ratio of the light reflecting pattern 22 is higher and the area ratio of the light transmitting pattern 23 is lower, whereas in the LED peripheral region 26, the area ratio of the light reflecting pattern 22 is lower and the area ratio of the light transmitting pattern 23 is higher. In this way, the output of light from the LED overlapping region 25 is suppressed and the output of light from the LED peripheral region 26 is promoted. Consequently, the amount of exit light is made uniform.

The reflector 18 includes the transmissive substrate 21 transmissive to light. The light reflecting pattern 22 is formed partly in the plate surface of the transmissive substrate 21, whereas the light transmitting pattern 23 is formed from portions of the transmissive substrate 21 in which the light reflecting pattern 22 is not formed. Accordingly, the light reflecting pattern 22 can be formed partly by applying ink and the like onto the plate surface of the transmissive substrate 21, the portions of the transmissive substrate 21 in which the ink and the like is not applied forming the light transmitting pattern 23. In this way, the reflector 18 can be easily produced, and production cost can be decreased in a preferable manner. This is useful, in particular, when the light reflecting pattern 22 and the light transmitting pattern 23 are complex.

According to the present embodiment, the liquid crystal display device (display device) 10 is provided with the backlight device 12 and the liquid crystal panel (display panel) 11 which displays an image using the light irradiated from the backlight device 12. In the liquid crystal display device 10, periodic luminance unevenness is suppressed in the exit light of the backlight device 12. Accordingly, high display quality can be obtained.

Second Embodiment

A second embodiment of the technology described herein will be described with reference to FIG. 4. In the second embodiment, unit LED regions 124 are modified. Redundant descriptions of structures, operations, and effects similar to those of the first embodiment will be omitted.

Figure 4:
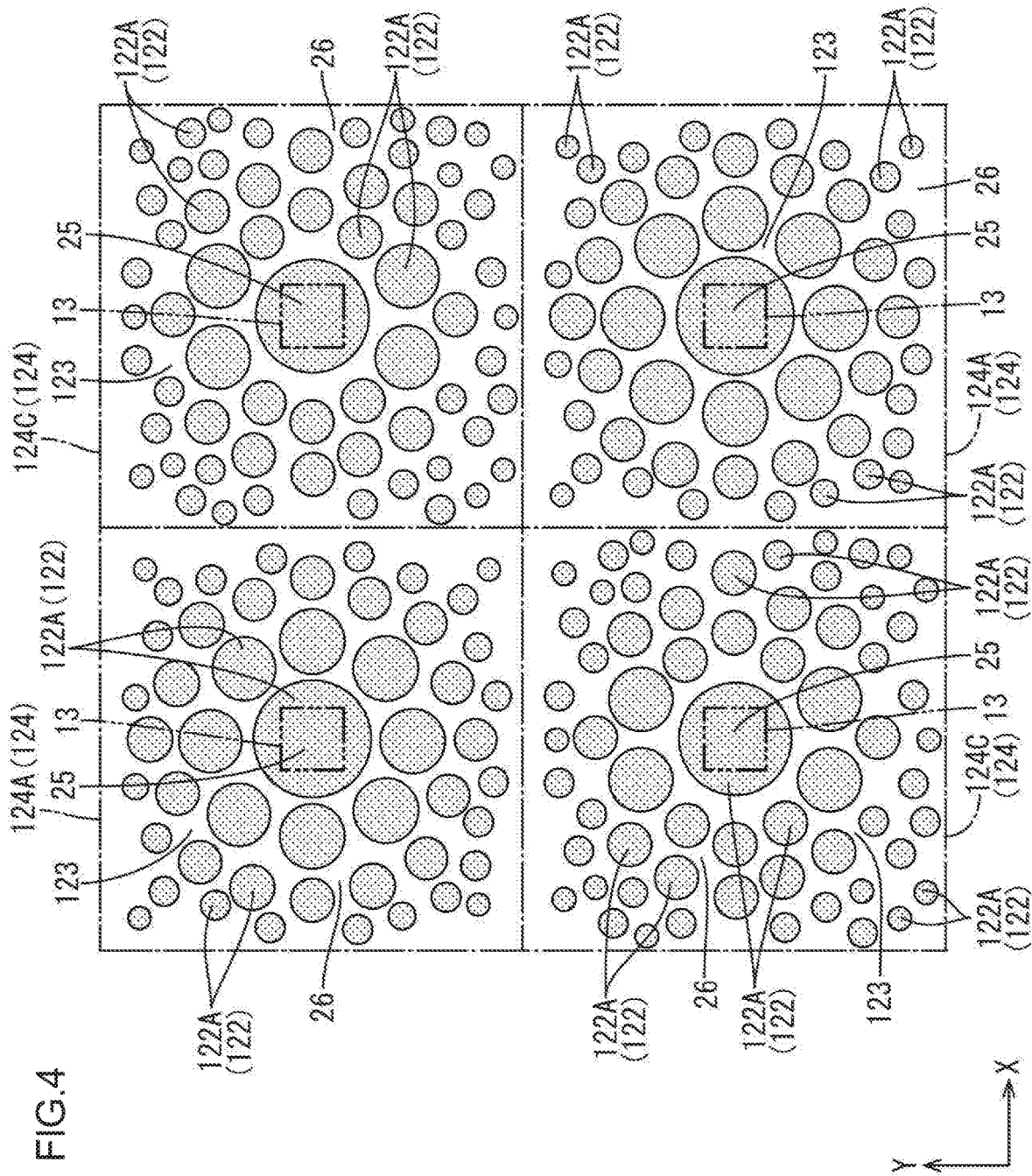
FIG. 4 is a plan view of unit LED regions on a reflector according to the second embodiment.

As illustrated in FIG. 4, in the present embodiment, the unit LED regions 124 include first unit LED regions 124A similar to those described in the first embodiment, and third unit LED regions 124C different from the second unit LED regions 24B (see FIG. 3) described in the first embodiment. The third unit LED regions 124C are depicted in the lower-left position and upper-right position of FIG. 4. In the present embodiment, the reference symbol for the third unit LED regions is provided with suffix "C". The third unit LED regions 124C are different from the first unit LED regions 124A and the second unit LED regions 24B in the distribution (arrangement and size of light reflecting dots 122A) of a light reflecting pattern 122 and a light transmitting pattern 123. Meanwhile, the third unit LED regions 124C are similar to the first unit LED regions 124A and the second unit LED regions 124B in the area ratios of the light reflecting pattern 122 and the light transmitting pattern 123. In this configuration, it is also possible to obtain the operation and effects similar to those of the first embodiment.

Third Embodiment

A third embodiment of the technology described herein will be described with reference to FIG. 5. In the third embodiment, the array of unit LED regions 224 is modified from the first and second embodiments. Redundant descriptions of structures, operations, and effects similar to those of the first and second embodiments will be omitted.

Figure 5:
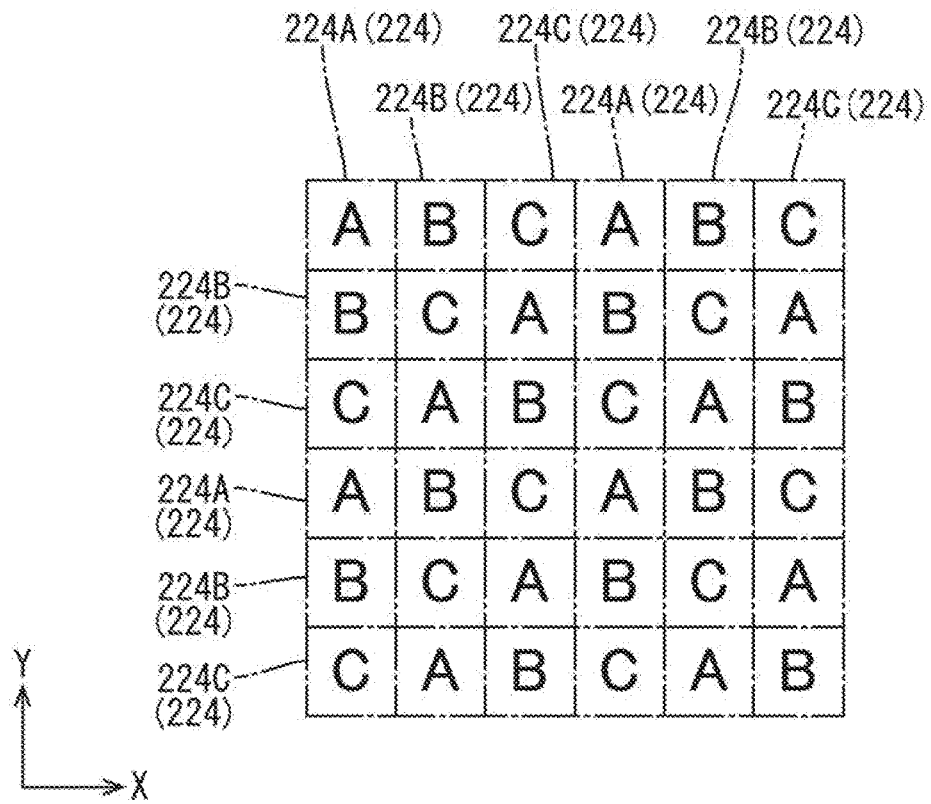
FIG. 5 is a schematic diagram of an array of unit LED regions on a reflector according to the third embodiment.

As illustrated in FIG. 5, in the present embodiment, the unit LED regions 224 include three types: first unit LED regions 224A and second unit LED regions 224B similar to those described in the first embodiment; and third unit LED regions 224C similar to those described in the second embodiment. FIG. 5 is a schematic diagram showing an array of six unit LED regions 224 arranged in each of the X-axis direction and the Y-axis direction. The diagram shows the letters "A to C" of the alphabet, of which "A" indicates the first unit LED regions 224A; "B" the second unit LED regions 224B; and "C" the third unit LED regions 224C. The unit LED regions 224 are disposed side by side in each of the X-axis direction and the Y-axis direction, repeatedly in the order of the first unit LED regions 224A, the second unit LED regions 224B and the third unit LED regions 224C. Thus, the unit LED regions 224 are disposed such that those adjacent to each other with respect to a diagonal direction relative to the X-axis direction and the Y-axis direction are of the same type. Specifically, the first unit LED regions 224A, the second unit LED regions 224B, and the third unit LED regions 224C are arrayed such that the same type is continuously arranged with respect to a diagonally upper-right direction (diagonally lower-left direction) in FIG. 5. Meanwhile, the first unit LED regions 224A, the second unit LED regions 224B, and the third unit LED regions 224C are arrayed such that different types are arranged adjacent to each other with respect to a diagonally lower-right direction (diagonally upper-left direction) in FIG. 5.

As described above, according to the present embodiment, the unit LED regions 224 include three or more types having different distributions of at least one of the light reflecting pattern and the light transmitting pattern. In this way, compared to if the unit LED regions had only two types, the number of combinations of the arrangement of the unit LED regions 224 is increased. Accordingly, at least one of the light reflecting pattern and the light transmitting pattern is less likely to have continuous periodicity with respect to at least one of the row direction and the column direction. In this way, visual recognition of periodic luminance unevenness is made more difficult.

Fourth Embodiment

A fourth embodiment of the technology described herein will be described with reference to FIG. 6 and FIG. 7. In the fourth embodiment, unit LED regions 324 are modified from those of the third embodiment. Redundant descriptions of structures, operations, and effects similar to those of the third embodiment will be omitted.

Figure 6:
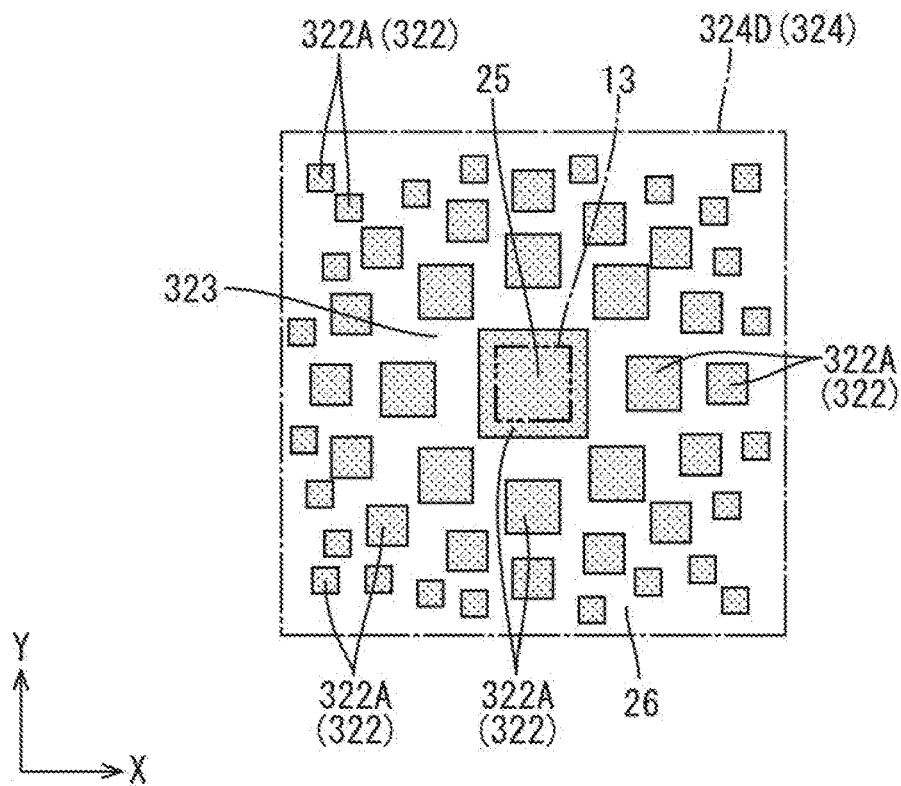
FIG. 6 is a plan view of unit LED regions on a reflector according to the fourth embodiment.

As illustrated in FIG. 6, according to the present embodiment, the unit LED regions 324 include those having a light reflecting pattern 322 including a large number of light reflecting dots 322A having a nearly square plane shape. In the following, such unit LED regions 324 will be referred to as "fourth unit LED region" with a suffix "D" attached thereto. In the fourth unit LED regions 324D, the light reflecting dots 322A of the light reflecting pattern 322 are different from first unit LED regions 324A to third unit LED regions 324C in not only plane shape but also in arrangement and size. Thus, the fourth unit LED regions 324D differ from the first unit LED regions 324A to the third unit LED regions 324C in the distribution of each of the light reflecting pattern 322 and a light transmitting pattern 323. Meanwhile, the fourth unit LED regions 324D are similar to the first unit LED regions 324A to the third unit LED regions 324C in the area ratios of the light reflecting pattern 322 and the light transmitting pattern 323.

Figure 7:
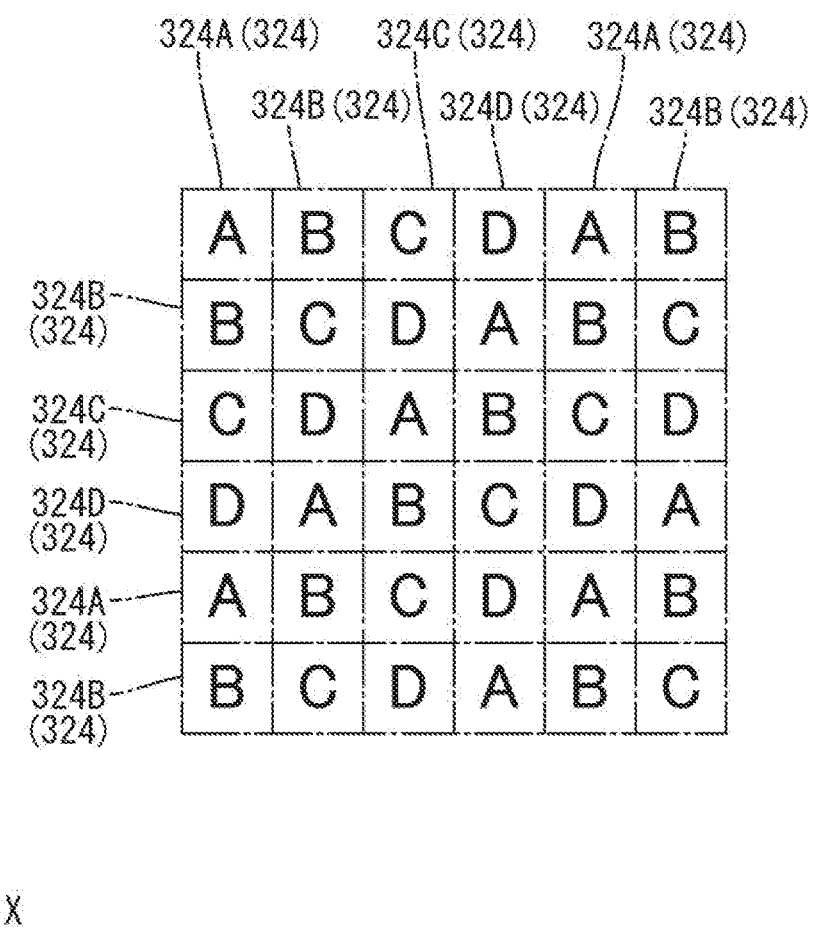
FIG. 7 is a schematic diagram of an array of unit LED regions on a reflector.

As illustrated in FIG. 7, in the present embodiment, the unit LED regions 324 have four types: the first unit LED regions 324A, the second unit LED regions 324B, and the third unit LED regions 324C similar to those described in the third embodiment; and the fourth unit LED regions 324D. FIG. 7 is a schematic diagram depicting, similarly to FIG. 5 relating to the third embodiment, an array of six unit LED regions 324 arranged in each of the X-axis direction and the Y-axis direction. In the diagram, the letter "D" of the alphabet indicates the fourth unit LED regions 324D. The unit LED regions 324 are disposed side by side in each of the X-axis direction and the Y-axis direction, in the order of the first unit LED regions 324A, the second unit LED regions 324B, the third unit LED regions 324C, and the fourth unit LED regions 324D repeatedly. Thus, the unit LED regions 324 are disposed such that those adjacent to each other with respect to a diagonal direction relative to the X-axis direction and the Y-axis direction are of the same type.

Fifth Embodiment

A fifth embodiment of the technology described herein will be described with reference to FIG. 8. In the fifth embodiment, the number of arrays of unit LED regions 424 is modified from the fourth embodiment. Redundant descriptions of structures, operations, and effects similar to those of the fourth embodiment will be omitted.

Figure 8:
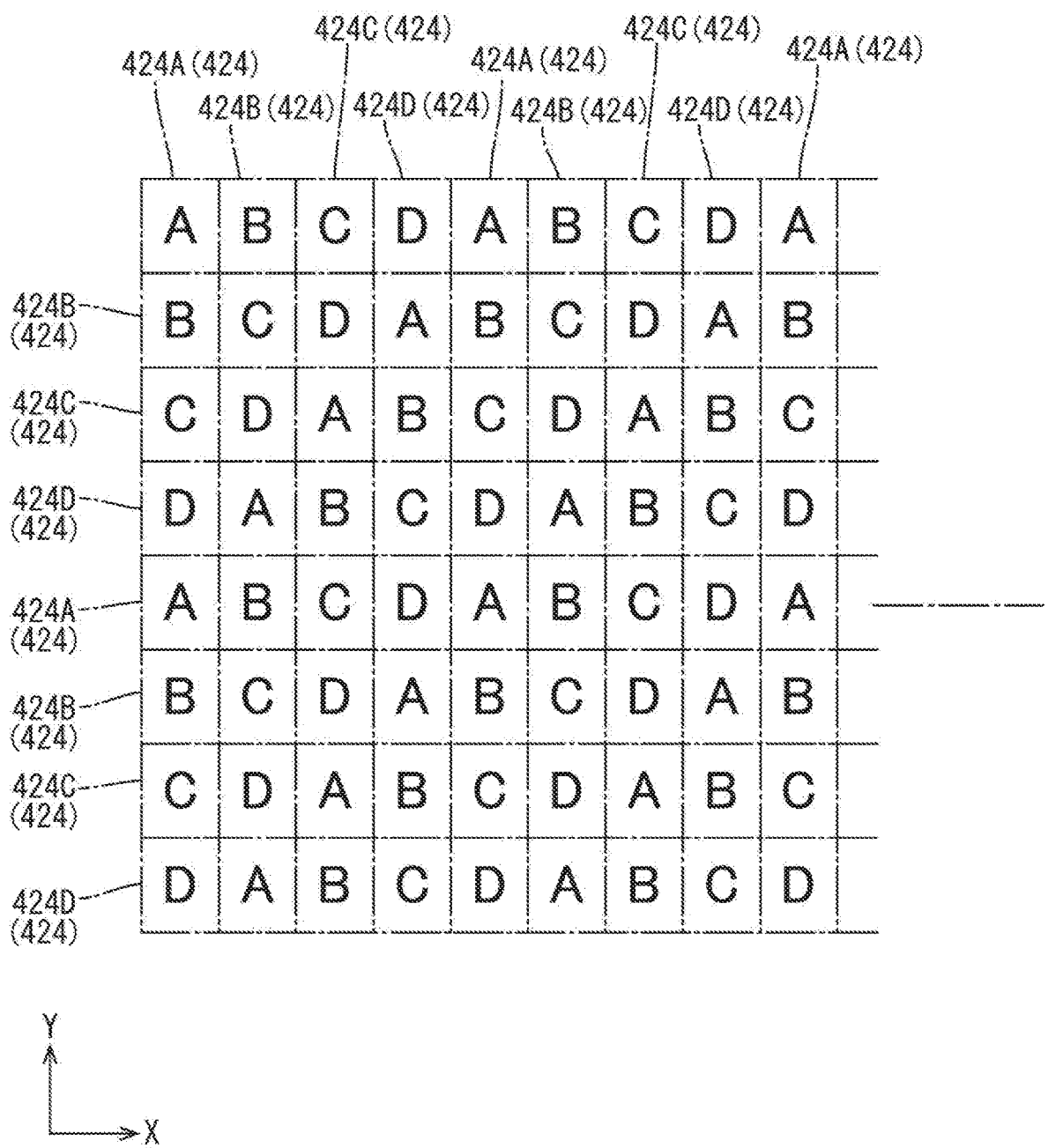
FIG. 8 is a schematic diagram of an array of unit LED regions on a reflector according to the fifth embodiment.

As illustrated in FIG. 8, according to the present embodiment, eight unit LED regions 424 are disposed side by side in the Y-axis direction, and nine or more unit LED regions 424 are disposed side by side in the X-axis direction. Thus, in the present embodiment, the minimum value of the number of the unit LED regions 424 arranged is eight. The unit LED regions 424 include, similarly to the fourth embodiment, four types having different distributions of each of the light reflecting pattern and the light transmitting pattern. The number of the types corresponds to the value of one half the number of the unit LED regions 424 arranged in the Y-axis direction (the minimum value of the number of the unit LED regions 424 arranged). In this way, at least two each of the first unit LED regions 424A, the second unit LED regions 424B, the third unit LED regions 424C, and the fourth unit LED regions 424D included in the unit LED regions 424 are disposed side by side with respect to the Y-axis direction. In the present embodiment, the unit LED regions 424 each have a longitudinal quadrangular shape.

As described above, according to the present embodiment, the number of types of the unit LED regions 424 having different distributions of at least one of the light reflecting pattern and the light transmitting pattern is a number greater than or equal to one half the minimum value of the number of the unit LED regions 424 arranged with respect to the row direction and the column direction. In this way, compared to if the number of types of the unit LED regions 424 having different distributions of at least one of the light reflecting pattern and the light transmitting pattern with respect to the row direction and the column direction were smaller than one half the minimum value of the number of the unit LED regions 424 arranged, visual recognition of periodic luminance unevenness is made difficult.

Sixth Embodiment

Figure 9:
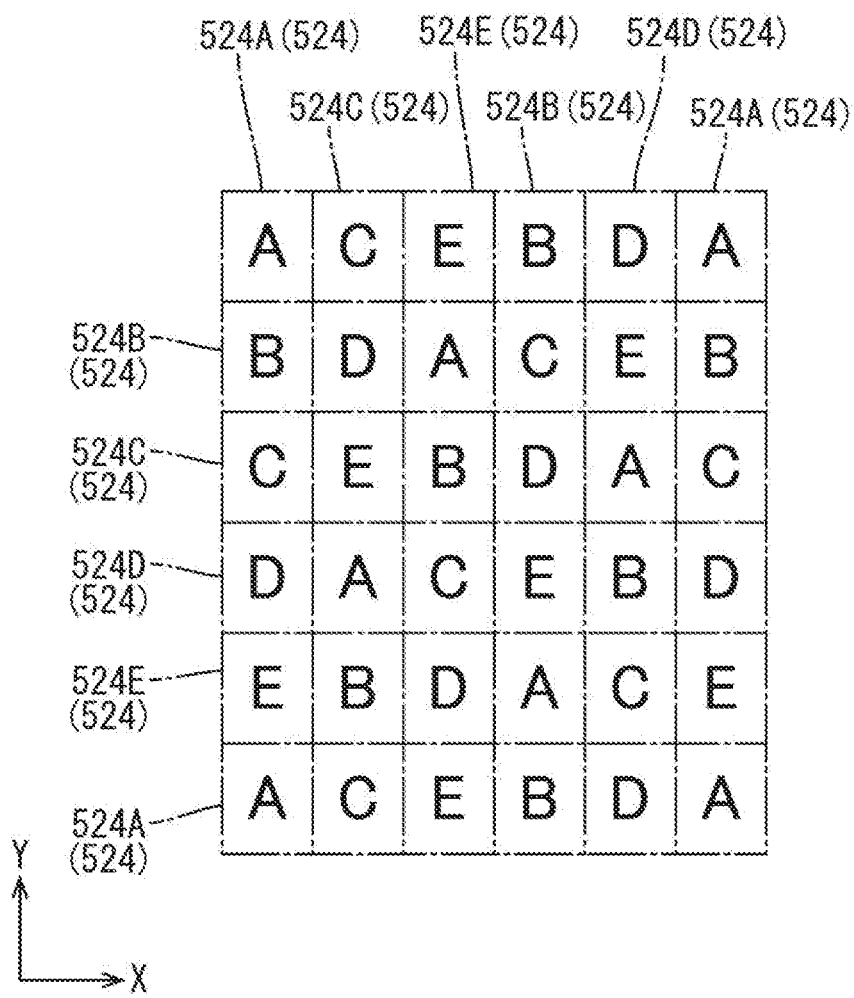
FIG. 9 is a schematic diagram of an array of unit LED regions on a reflector according to the sixth embodiment.

A sixth embodiment of the technology described herein will be described with reference to FIG. 9. In the sixth embodiment, unit LED regions 524 are modified from the fourth embodiment. Redundant descriptions of structures, operations, and effects similar to those of the fourth embodiment will be omitted.

According to the present embodiment, the unit LED regions 524 include five types: the first unit LED regions 524A, the second unit LED regions 524B, the third unit LED regions 524C, and the fourth unit LED regions 524D described in the fourth embodiment; and fifth unit LED regions 524E having distributions of the light reflecting pattern and the light transmitting pattern different from those of the above. In the following, the additional unit LED regions 524 will be referred to as "fifth unit LED region" with suffix "E" applied thereto. FIG. 9, similarly to FIG. 7 relating to the fourth embodiment, is a schematic diagram of the array of six unit LED regions 524 arranged in each of the X-axis direction and the Y-axis direction. In the diagram, the letter "E" of the alphabet indicates the fifth unit LED regions 524E. The first unit LED regions 524A, the second unit LED regions 524B, the third unit LED regions 524C, the fourth unit LED regions 524D, and the fifth unit LED regions 524E are arrayed such that different types are arranged adjacent to each other with respect to both the diagonally lower-right direction (diagonally upper-left direction) and the diagonally upper-right direction (diagonally lower-left direction) in FIG. 9.

As described above, according to the present embodiment, the unit LED regions 524 are disposed such that those adjacent to each other with respect to the diagonal directions relative to the row direction and the column direction have different distributions of at least one of the light reflecting pattern and the light transmitting pattern. In this way, at least one of the light reflecting pattern and the light transmitting pattern is prevented from having continuous periodicity with respect to each of the diagonal directions, in addition to the row direction and the column direction. Accordingly, visual recognition of periodic luminance unevenness is made more difficult.

Seventh Embodiment

A seventh embodiment of the technology described herein will be described with reference to FIG. 10. In the seventh embodiment, the configuration of unit LED regions 624 is modified from the first embodiment. Redundant descriptions of structures, operations, and effects similar to those of the first embodiment will be omitted.

Figure 10:
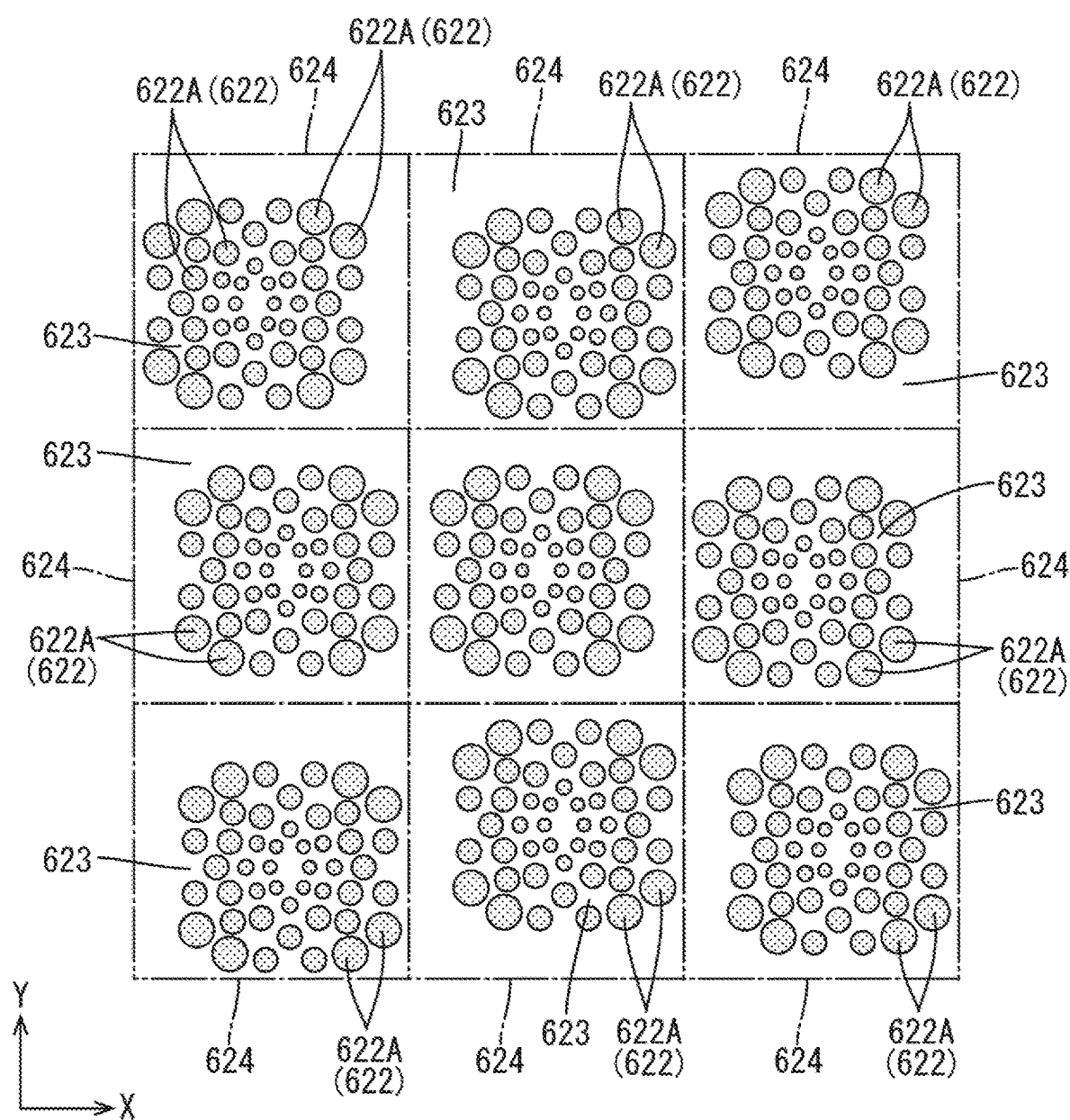
FIG. 10 is a plan view of unit LED regions on a reflector according to the seventh embodiment.

As illustrated in FIG. 10, in the present embodiment, the unit LED regions 624 have the same distribution of a light reflecting pattern 622. Specifically, in the unit LED regions 624 adjacent to each other with respect to the X-axis direction and the Y-axis direction, while a certain positional relationship of a large number of light reflecting dots 622A forming the respective light reflecting pattern 622 is maintained, the unit LED regions 624 have different arrangements of the light reflecting pattern 622 as a whole with respect to the X-axis direction and the Y-axis direction. That is, the positional relationship of the center position of the light reflecting pattern 622 with respect to the center position of the unit LED regions 624 is different between the adjacent unit LED regions 624 with respect to the X-axis direction and the Y-axis direction. Thus, the distribution of the light reflecting pattern 622 is made common, making it possible to reduce the cost of forming the light reflecting pattern 622 during the production of the reflector. In this configuration, the unit LED regions 624 adjacent to each other with respect to the X-axis direction and the Y-axis direction have different distributions of the respective light transmitting pattern 623.

Eighth Embodiment

An eighth embodiment of the technology described herein will be described with reference to FIG. 11. In the eighth embodiment, the arrangement of unit LED regions 724 is modified from the seventh embodiment. Redundant descriptions of structures, operations, and effects similar to those of the seventh embodiment will be omitted.

As illustrated in FIG. 11, in the present embodiment, the unit LED regions 724 are disposed such that those adjacent to each other with respect to the Y-axis direction have the same distribution of each of a light reflecting pattern 722 and a light transmitting pattern 723. Specifically, the present embodiment is similar to the seventh embodiment in that, between the unit LED regions 724 adjacent to each other with respect to the X-axis direction and the Y-axis direction, a certain positional relationship of a large number of light reflecting dots 722A forming the respective light reflecting pattern 722 is maintained. The present embodiment is also similar to the seventh embodiment in that the unit LED regions 724 adjacent to each other with respect to the X-axis direction have different arrangements of the light reflecting pattern 722 as a whole with respect to the X-axis direction and the Y-axis direction in the unit LED regions 724. However, in the present embodiment, the unit LED regions 724 adjacent to each other with respect to the Y-axis direction have the same arrangement of the light reflecting pattern 722 as a whole with respect to the X-axis direction and the Y-axis direction in the unit LED regions 724. Thus, the unit LED regions 724 that are arranged forming a single column in the Y-axis direction have a common distribution of the light reflecting pattern 722 and light transmitting pattern 723. Accordingly, the cost required to form the light reflecting pattern 722 during production of the reflector can be further reduced.

As described above, according to the present embodiment, the unit LED regions 724 are disposed such that those adjacent to each other with respect to one of the row direction and the column direction have the same distribution of each of the light reflecting pattern 722 and the light transmitting pattern 723. In this way, the unit LED regions 724 adjacent to each other with respect to one of the row direction and the column direction have a common distribution of each of the light reflecting pattern 722 and the light transmitting pattern 723. Accordingly, it becomes possible to further reduce the production cost relating to the reflector.

Ninth Embodiment

A ninth embodiment of the technology described herein will be described with reference to FIG. 12. In the ninth embodiment, the configuration of unit LED regions 824 is modified from the first embodiment. Redundant descriptions of structures, operations, and effects similar to those of the first embodiment will be omitted.

Figure 12:
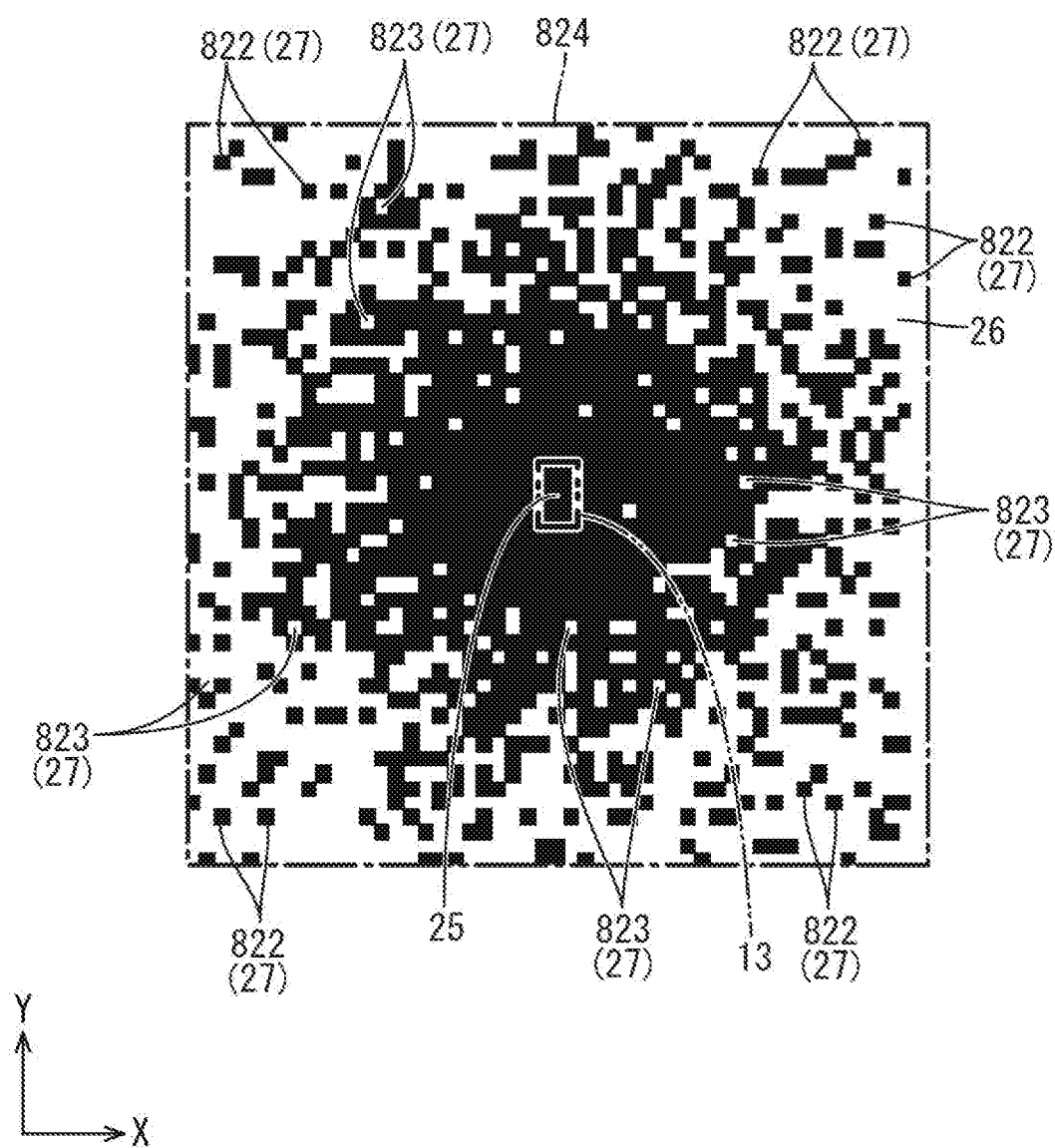
FIG. 12 is a plan view of unit LED regions on a reflector according to the ninth embodiment.

As illustrated in FIG. 12, according to the present embodiment, the unit LED region 824 is partitioned into unit regions 27 arranged to fill the plane. A light reflecting pattern 822 and a light transmitting pattern 823 are allocated to unit regions 27 so as to have a non-point symmetric distribution in the unit LED region 824. The unit regions 27 have a nearly square plane shape. Due to the light reflecting pattern 822 and the light transmitting pattern 823 distributed in a non-point symmetric manner in the unit LED region 824, the luminance distribution of the exit light of the unit LED region 824 becomes non-point symmetric. If the light reflecting portion and the light transmitting portion in the unit LED region had a point symmetric distribution, the luminance distribution of the exit light from the unit LED region would become point-symmetric. Consequently, the lines of bright/dark boundary would tend to become concentric, and luminance unevenness would become more readily visually recognizable. In comparison, when the luminance distribution of the exit light of the unit LED region 824 is non-point symmetric, the bright/dark boundary is dispersed in a discontinuous manner. Accordingly, the luminance distribution of the exit light becomes complex and smooth as a whole. Consequently, visual recognition of luminance unevenness becomes difficult. When the light reflecting pattern 822 and the light transmitting pattern 823 are allocated to the unit regions 27, random number values may be set in the unit regions 27 and the allocation may be made based on the random number values. In this way, it becomes possible to allocate the light reflecting pattern 822 and the light transmitting pattern 823 to the unit regions 27 randomly.

Tenth Embodiment

A tenth embodiment of the technology described herein will be described with reference to FIG. 13 or FIG. 14. In the tenth embodiment, the configuration of a reflector 918 is modified from the first embodiment. Redundant descriptions of structures, operations, and effects similar to those of the first embodiment will be omitted.

Figure 13:
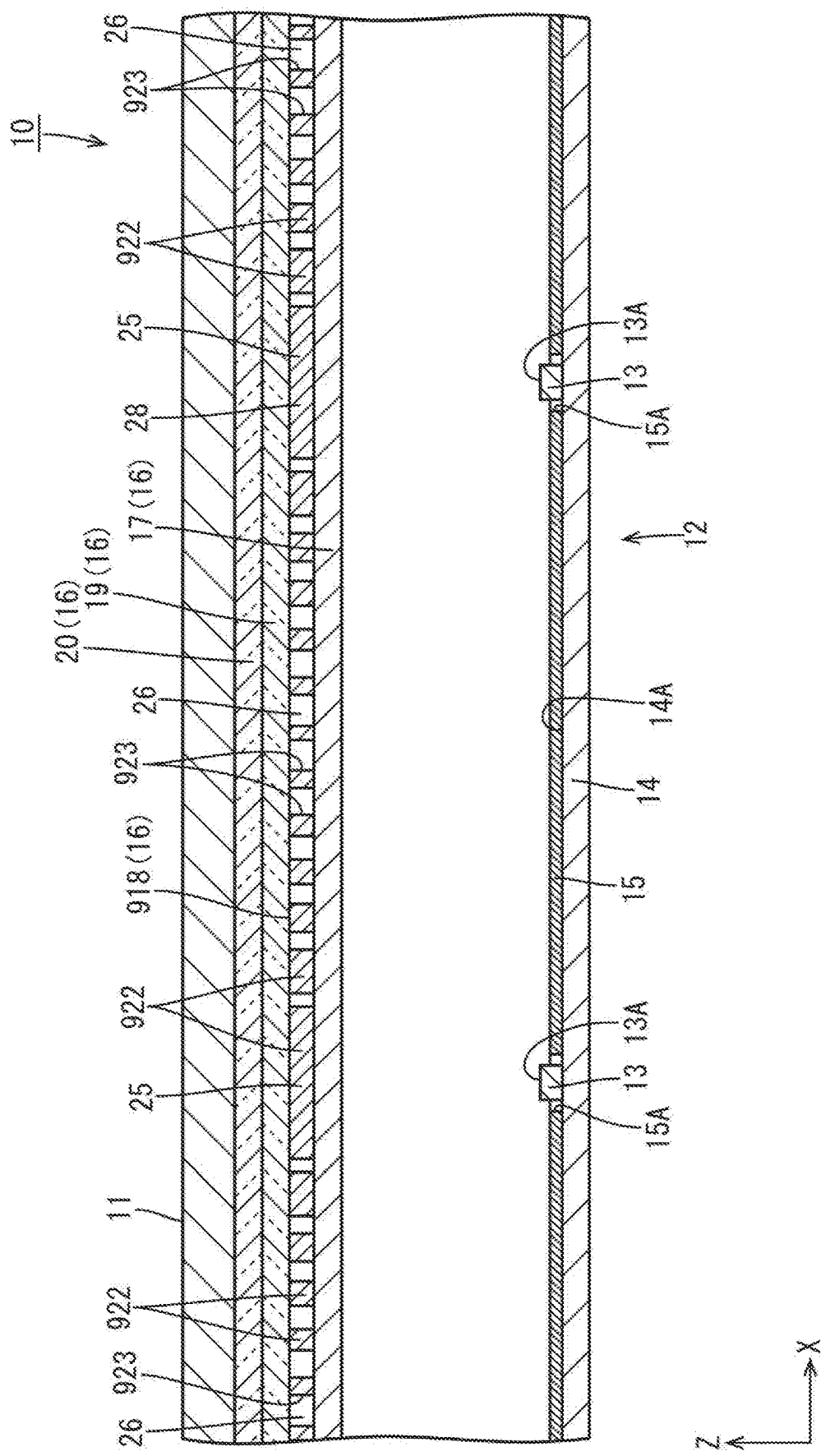
FIG. 13 is a cross sectional view of a liquid crystal display device according to the tenth embodiment.
Figure 14:
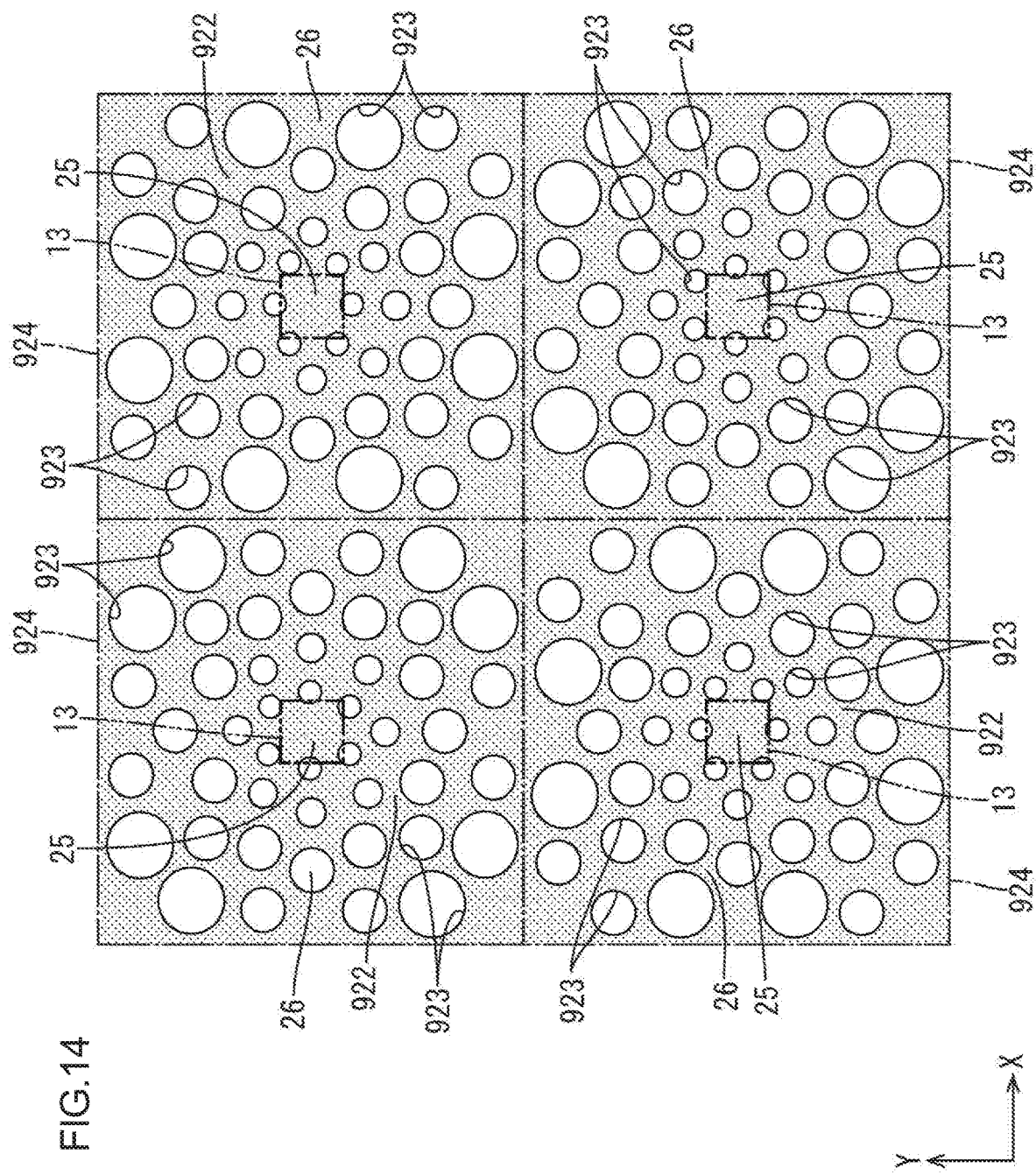
FIG. 14 is a plan view of unit LED regions on a reflector.

As illustrated in FIG. 13, in the present embodiment, the reflector 918 is made of synthetic resin and includes a reflecting substrate 28 reflecting light. The reflecting substrate 28 has a highly optically reflective white plate surface. A light transmitting pattern 923 is formed by partly opening the reflecting substrate 28. On the other hand, a light reflecting pattern 922 is provided by portions of the reflecting substrate 28 in which the light transmitting pattern 923 (openings) is not formed. The openings of the light transmitting pattern 923 are formed penetrating through the reflecting substrate 28 in the Z-axis direction (plate thickness direction). The light reflecting pattern 922 and the light transmitting pattern 923 have distributions illustrated in FIG. 14. The openings of the light transmitting pattern 923 have a circular plane shape. In FIG. 14, a total of four unit LED regions 924 including two arranged with respect to each of the X-axis direction and the Y-axis direction are depicted in a representative manner. In each unit LED region 924, the light reflecting pattern 922 (non-opening portions) are indicated by shading. In this configuration, the light transmitting pattern 923 can be formed by partly opening the reflecting substrate 28, where the portions of the reflecting substrate 28 in which the openings are not provided form the light reflecting pattern 922. In this way, the positional accuracy and dimensional accuracy of the light transmitting pattern 923 formed of the openings in the reflecting substrate 28 are increased. Accordingly, the light reflecting pattern 922 and the light transmitting pattern 923 can provide light reflecting performance and light transmitting performance, respectively, in an appropriate manner.

Other Embodiments

The technology described herein is not limited to the embodiments described above and with reference to the drawings. The following embodiments may be included in the technical scope.

Figure 15:
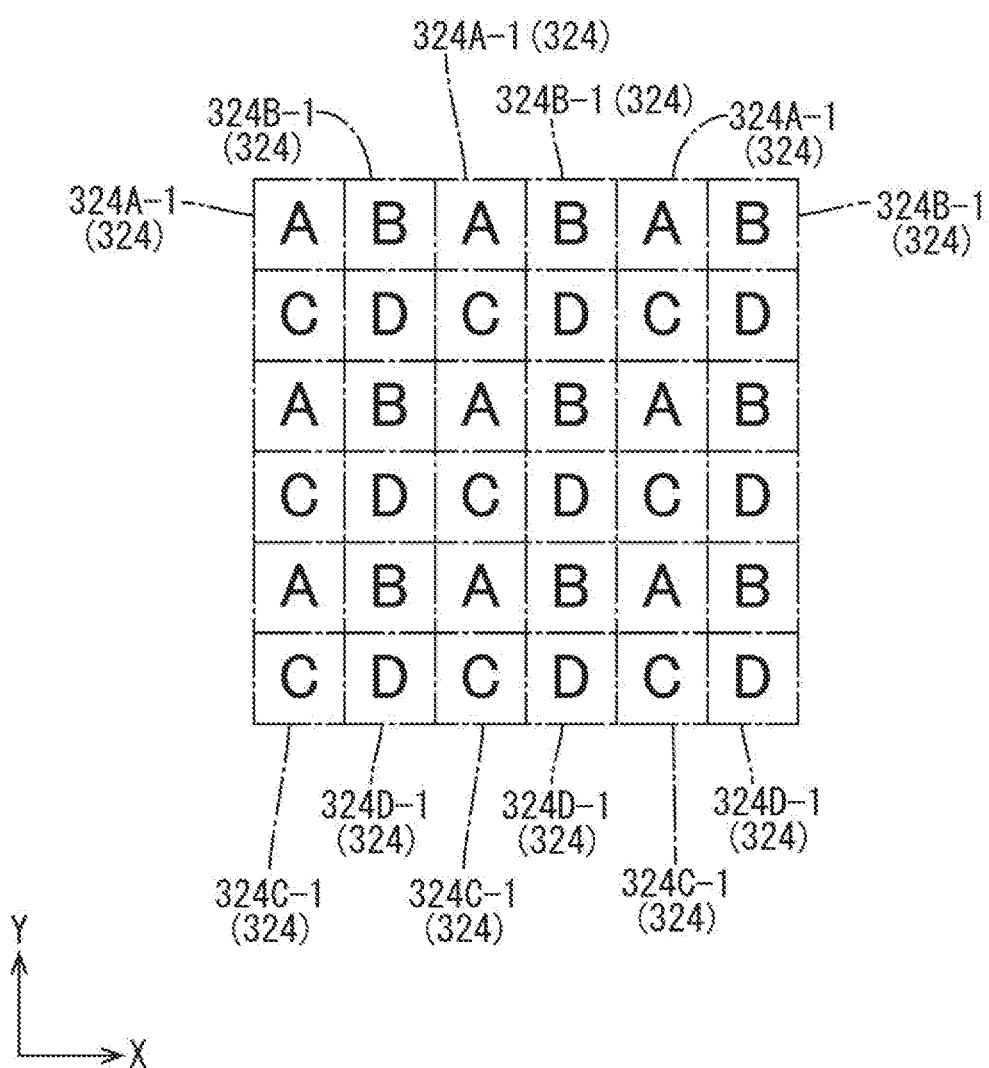
FIG. 15 is a schematic diagram of an array of unit LED regions on a reflector according to another embodiment (1).

(1) In a modification of the fourth embodiment, as illustrated in FIG. 15, the odd-numbered rows with respect to the Y-axis direction may be arrayed such that first unit LED regions 324A-1 and second unit LED regions 324B-1 are alternately and repeatedly arranged in the X-axis direction. The even-numbered rows with respect to the Y-axis direction may be arrayed such that third unit LED regions 324C-1 and fourth unit LED regions 324D-1 are alternately and repeatedly arranged in the X-axis direction.

(2) Other than according to the foregoing embodiments, the specific distribution of the light reflecting pattern and the light transmitting pattern in the unit LED region may be modified, as appropriate. For example, the light reflecting pattern and the light transmitting pattern may have a point-symmetric distribution. The light reflecting pattern and the light transmitting pattern may have a random distribution without regularity, or a distribution having regularity.

(3) Other than according to the foregoing embodiments, the specific order of arrangement or the number of installments (the number arranged) and the like of the unit LED regions having different light reflecting patterns or light transmitting patterns may be modified, as appropriate. For example, the unit LED regions having different light reflecting patterns or light transmitting patterns may be randomly arrayed without regularity. The number of the LEDs and the like installed may also be modified, as appropriate.

(4) In the configuration described in the first to ninth embodiments, the plane shape of the light reflecting dots may be modified from being circular or square, as appropriate, to elliptical, semicircular, oval, rectangular, rhombus, trapezoid, triangle, pentagon, or other polygons, for example.

(5) In the configuration described in the tenth embodiment, the plane shape of the openings in the light transmitting pattern may be modified from being circular, as appropriate, to elliptical, semicircular, oval, square, rectangular, rhombus, trapezoid, triangle, pentagon, or other polygons, for example.

(6) Other than according to the foregoing embodiments, the specific plane shape and the like of the unit LED region may be modified, as appropriate. Similarly, the specific plane shape and the like of the LEDs may also be modified, as appropriate.

(7) Other than according to the ninth embodiment, the specific plane shape of the unit region may be modified from being square, as appropriate. For example, the plane shape may be regular polygons, such as regular triangle, parallelogram, regular pentagon, and regular octagon. The plane shape of the unit region may be non-regular polygons, such as non-regular triangle, rectangular, and trapezoid, or may be non-polygons such as circular and elliptical.

(8) It is possible to set multiple types of unit regions differing in plane shape or outer shape dimension (size).

(9) When the light reflecting pattern and the light transmitting pattern are allocated to the unit regions, the light reflecting pattern and the light transmitting pattern may be allocated to the respective regions randomly without using random numbers.

(10) The unit LED regions adjacent to each other with respect to the X-axis direction may have a common light reflecting pattern and a common light transmitting pattern.

(11) It is possible to form the light reflecting pattern on the front-side plate surface of the transmissive substrate of the reflector.

(12) The reflecting substrate of the reflector may be made of metal. In this case, it is possible to form highly precise openings (light transmitting portions) by subjecting the reflecting substrate to an etching process.

(13) The configurations described in the seventh or eighth embodiment may be combined with the configuration described in the tenth embodiment. In this case, it becomes possible to use a single shape for the punching die for forming the openings in the reflecting substrate for the light transmitting pattern. In this way, production cost can be reduced in a preferable manner.

(14) Other than according to (13), it is possible to combine the configurations described in the respective embodiments, as appropriate.

(15) Other than according to the foregoing embodiments, the box-like frame for holding the peripheral end portions of the optical member in the backlight device may include partitioning walls separating the LEDs arranged in a matrix. In this case, preferably, the portioning walls have a highly optically reflective white surface, for example.

(16) Other than according to the foregoing embodiments, the number of the layers in the optical member, the order in which the layers are laminated, the type and the like of the layers may be modified, as appropriate. For example, no optical member (diffusion sheet) may be interposed between the reflector and the LEDs, and the reflector may be directly opposed to the LEDs.

(17) It is possible to use organic EL and the like as the light source, other than LEDs.

(18) The technology described herein is applicable to various types of display panel (such as micro-electro-mechanical-systems (MEMS) display panel), other than the liquid crystal panel used as a display panel in the embodiments.

The invention claimed is:

1. A lighting device comprising:
light sources arranged in a row direction and a column direction; and
an optical substrate including
unit light source regions disposed at an interval from light sources and disposed in the row direction and the column direction,
the unit light source regions including a first unit light source region and a second unit light source region that are adjacent to each other with respect to one of the row direction and the column direction,
each of the unit light source regions comprising light reflecting portions and light transmitting portions,
the light reflecting portions reflecting a part of light rays emitted by the light sources, the light reflecting portions in the first unit light source region being first light reflecting portions that are arranged with a first pattern and the light reflecting portions in the second unit light source region being second light reflecting portions that are arranged with a second pattern,
each of the first and second patterns comprising a rotationally asymmetric distribution of light reflecting dots,
the first light reflecting portions and the second light reflecting portions that are two adjacent light reflecting portions differ in mutual position relations of the first light reflecting portions in the first unit light source region and mutual position relations of the second light reflecting portions in the second unit light source region, and
the light transmitting portions transmitting another part of the light rays and including a first light transmitting portion in the first unit light source region and a second light transmitting portion in the second unit light source region, wherein an area ratio of a total area of the first light reflecting portions and an area of the first light transmitting portions in the first unit light source region is equal to an area ratio of a total area of the second light reflecting portions and an area of the second light transmitting portions in the second unit light source region.

2. The lighting device according to claim 1, wherein
the first unit light source region includes first unit light source regions and the second unit light source region includes second unit light source regions, and
the first unit light source regions and the second unit light source regions are arranged such that the first unit light source regions are not arranged next to each other and the second unit light source regions are not arranged next to each other in the row direction and the column direction.

3. The lighting device according to claim 2, wherein the first light reflecting portions in the first unit source regions have the first pattern with a same orientation.

4. The lighting device according to claim 2, wherein one of the first unit light source regions and the second unit light source regions are arranged adjacent to each other with respect to a diagonal direction relative to the row direction and the column direction.

5. The lighting device according to claim 2, wherein the light reflecting portions are arranged with different patterns in the unit light source regions and a number of the patterns is greater than a half or more of a smallest number of the unit light source regions arranged with respect to the row direction and the column direction.

6. The lighting device according to claim 1, wherein
the unit light source regions further include a third unit light source region that is adjacent to one of the first unit light source region and the second unit light source region with respect to one of the row direction and the column direction and includes third light reflecting portions that are arranged with a third pattern in the third unit light source region, and
the third unit light source region includes third unit light source regions that are arranged such that the third unit light source regions are not arranged next to each other.

7. The lighting device according to claim 6, wherein
first unit light source region includes first unit light source regions and the second unit light source region includes second unit light source regions, and
the first unit light source regions, the second unit light source regions, and the third unit light source regions are arranged such that different unit light source regions are adjacent to each other with respect to a diagonal direction relative to the row direction and the column direction.

8. The lighting device according to claim 1, wherein each of the unit light source regions is partitioned into unit regions over a plane surface thereof, and the light reflecting portions are allocated to the unit regions so as to have a non-point symmetric distribution in each of the unit light source regions.

9. The lighting device according to claim 1, wherein
each of the unit light source regions includes a light source overlapping region overlapping one of the light sources and a light source peripheral region disposed around the light source overlapping region,
the light reflecting portions are provided so as to have a higher area ratio in the light source overlapping region than in the light source peripheral region in each of the unit light source regions, and the light transmitting portion is provided so as to have a higher area ratio in the light source peripheral region than in the light source overlapping region in each of the unit light source regions.

10. The lighting device according to claim 1, wherein
the optical substrate is a transmissive substrate transmissive to light,
the light reflecting portions are arranged on portions of a plate surface of the transmissive substrate, and
the light transmitting portions are portions of the transmissive substrate where the light reflecting portions are not arranged.

11. The lighting device according to claim 1, wherein
the light reflecting portions are light reflecting dots,
the light reflecting dots are arranged with the first pattern in the first unit light source region and the light reflecting dots are arranged with the second pattern in the second unit light source region.

12. A lighting device comprising:
light sources arranged in a row direction and a column direction; and
an optical substrate including
unit light source regions disposed at an interval from light sources and disposed in the row direction and the column direction,
the unit light source regions including a first unit light source region and a second unit light source region that are adjacent to each other with respect to one of the row direction and the column direction,
each of the unit light source regions comprising light reflecting portions and light transmitting portions,
the light reflecting portions reflecting a part of light rays emitted by the light sources and including a first light reflecting portion in the first unit light source region and a second light reflecting portion in the second unit light source region,
the light transmitting portions transmitting another part of the light rays, the light transmitting portions in the first unit light source region being first light transmitting portions that are arranged with a first pattern and the light transmitting portions in the second unit light source region being second light transmitting portions that are arranged with a second pattern,
each of the first and second patterns comprising rotationally asymmetric distribution of light transmitting holes, and
the first light transmitting portions and the second light transmitting portions that are two adjacent light transmitting portions differ in mutual position relations of the first light transmitting portions in the first unit light source region and mutual position relations of the second light transmitting portions in the second unit light source region, wherein
an area ratio of an area of the first light reflecting portions and a total area of the first light transmitting portions in the first unit light source region is equal to an area ratio of an area of the second light reflecting portions and a total area of the second light transmitting portions in the second unit light source region.

13. The lighting device according to claim 12, wherein
the first unit light source region includes first unit light source regions and the second unit light source region includes second unit light source regions, and
the first unit light source regions and the second unit light source regions are arranged such that the first unit light source regions are not arranged next to each other and the second unit light source regions are not arranged next to each other in the row direction and the column direction.

14. The lighting device according to claim 13, wherein the first light transmitting portions in the first unit source regions have the first pattern with a same orientation.

15. The lighting device according to claim 13, wherein one of the first unit light source regions and the second unit light source regions are arranged adjacent to each other with respect to a diagonal direction relative to the row direction and the column direction.

16. The lighting device according to claim 12, wherein
the optical substrate is a reflecting substrate reflecting light,
the light transmitting portions are holes in the reflecting substrate, and
the light reflecting portions are portions of the reflecting substrate where the light transmitting portions are not formed.

* * * * *